US012694304B2

(12) United States Patent　(10) Patent No.: US 12,694,304 B2

Uehara et al.　(45) Date of Patent: Jul. 28, 2026

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Hideaki Uehara, Yokohama (JP); Kenji Hirohata, Tokyo (JP); Tomoyuki Suzuki, Tokyo (JP); Yasutaka Ito, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 724 days.

(21) Appl. No.: 18/173,374

(22) Filed: Feb. 23, 2023

(65) Prior Publication Data

US 2023/0351218 A1 　Nov. 2, 2023

(30) Foreign Application Priority Data

Apr. 28, 2022　(JP) ................................. 2022-074276

(51) Int. Cl.
*G06N 5/022* (2023.01)

(52) U.S. Cl.
CPC .................................... *G06N 5/022* (2013.01)

(58) Field of Classification Search
CPC .......... G06N 5/022; G06N 3/084; G06N 3/09; G06N 3/042; G05B 23/024; G05B 23/0283
See application file for complete search history.

(56) References Cited

U.S. PATENT DOCUMENTS 7,272,454 B2 * 9/2007 Wojsznis ............. G05B 13/027
　　　　　　　　　　　　　　　　　　700/28
8,965,712 B2 * 2/2015 Omori ..................... H01L 24/17
　　　　　　　　　　　　　　　　　　702/182

(Continued)

FOREIGN PATENT DOCUMENTS

JP　　　2005-44337 A　　2/2005
JP　　　2006-277370 A　　10/2006

(Continued)

OTHER PUBLICATIONS

Steven L. Brunton et al., "Discovering governing equations from data by sparse identification of nonlinear dynamical systems," Proc. Nat'l. Acad. Sci., vol. 113, No. 15, pp. 3932-3937 (2016).

(Continued)

*Primary Examiner* — Michael Jared Walker

(74) *Attorney, Agent, or Firm* — Finnegan, Henderson, Farabow, Garrett & Dunner, LLP

(57) ABSTRACT

According to one embodiment, an information processing device includes a memory and one or more processors coupled to the memory. The one or more processors are configured to: generate, by machine learning using time-series data of a variable for a phenomenon related to an abnormality in a system to be monitored, a prediction model for predicting an indicator used to identify the a timing of system maintenance and a physical model for predicting the variable; and perform either one of a first prediction process using the physical model that is learned using the indicator predicted by the prediction model and a second prediction process of correcting the indicator predicted by the prediction model by using the variable predicted by the physical model.

10 Claims, 14 Drawing Sheets

(56)  References Cited

U.S. PATENT DOCUMENTS

| | | | | |
|---|---|---|---|---|
| 11,402,817 | B2 * | 8/2022 | Kubo | G05B 19/4065 |
| 2004/0249483 | A1 * | 12/2004 | Wojsznis | G05B 13/048 |
| | | | | 700/19 |
| 2008/0249743 | A1 * | 10/2008 | Hirohata | G01R 31/2803 |
| | | | | 702/186 |
| 2015/0339572 | A1 * | 11/2015 | Achin | G06N 5/04 |
| | | | | 706/46 |
| 2016/0147204 | A1 * | 5/2016 | Wichmann | G05F 1/66 |
| | | | | 700/287 |
| 2019/0265657 | A1 * | 8/2019 | Inagaki | G05B 23/024 |
| 2022/0014761 | A1 * | 1/2022 | Zhang | H04N 19/176 |
| 2022/0114417 | A1 * | 4/2022 | Dalli | G06N 3/08 |
| 2022/0147671 | A1 * | 5/2022 | Suzuki | G06F 30/27 |
| 2022/0343042 | A1 * | 10/2022 | Suzuki | G06F 30/27 |
| 2022/0366101 | A1 * | 11/2022 | Suzuki | G06F 30/20 |
| 2023/0123322 | A1 * | 4/2023 | Cella | G05B 23/0283 |
| | | | | 700/29 |
| 2023/0123527 | A1 * | 4/2023 | Michael | G06N 3/084 |
| | | | | 702/183 |
| 2024/0119470 | A1 * | 4/2024 | Paul | G06Q 30/0202 |

FOREIGN PATENT DOCUMENTS

| | | | |
|---|---|---|---|
| JP | 3884294 | B2 | 2/2007 |
| JP | 5175911 | B2 | 4/2013 |
| JP | 2016-119067 | A | 6/2016 |
| JP | 6863930 | B2 | 4/2021 |
| JP | 2022-75213 | A | 5/2022 |
| JP | 2022-167093 | A | 11/2022 |
| JP | 2022-167097 | A | 11/2022 |

OTHER PUBLICATIONS

Japan Patent Office, Decision to Grant a Patent in JP App. No. 2022-074276 (Jun. 3, 2025).

* cited by examiner

FIG.4

| | |
|---|---|
| HEAT CONDUCTION SUB-LIBRARY | $[T_i - T_j]$ |
| RADIATION SUB-LIBRARY | $[T_i^4 - T_j^4]$ |
| FORCED CONVECTION SUB-LIBRARY | $\left\{ \left[ \Delta T_{i\sim j} v^{a1} \right], \left[ \Delta T_{i\sim j} v^{a2} \right], \cdots \right\}$ |
| NATURAL CONVECTION SUB-LIBRARY | $\left\{ \left[ \left( \dfrac{2\lvert \Delta T_{i\sim j} \rvert}{T_i + T_j} \right)^{b1} \Delta T_{i\sim j} \right], \left[ \left( \dfrac{2\lvert \Delta T_{i\sim j} \rvert}{T_i + T_j} \right)^{b2} \Delta T_{i\sim j} \right], \cdots \right\}$ |
| HEAT GENERATION SUB-LIBRARY | $[i_1 V, i_2 V, \cdots]$ |

FIG.5

| NAME OF SUB-LIBRARY | EXPONENT | GENERATION PROBABILITY |
|---|---|---|
| FORCED CONVECTION SUB-LIBRARY | a1 | 0.3 |
| | a2 | 0.1 |
| | ... | ... |
| NATURAL CONVECTION SUB-LIBRARY | b1 | 0.2 |
| | b2 | 0.35 |
| | ... | ... |
| ... | ... | ... |

FIG.6

| TIME | Temp1 | Temp2 | Temp3 | Temp4 | Temp5 | v | i1 | i2 | V |
|---|---|---|---|---|---|---|---|---|---|
| s | K | K | K | K | K | m/s | A | A | V |
| 0.0 | 293.0 | 293.0 | 293.0 | 293.0 | 293 | 4.3 | 0.50 | 0.52 | 10.8 |
| 0.5 | 296.7 | 294.9 | 293.1 | 293.0 | 293 | 4.1 | 0.55 | 0.53 | 10.2 |
| 1.0 | 297.5 | 296.6 | 293.2 | 293.1 | 293 | 4.3 | 0.53 | 0.51 | 10.7 |
| 1.5 | 297.8 | 298.1 | 293.3 | 293.2 | 293 | 4.1 | 0.53 | 0.52 | 10.3 |
| 2.0 | 298.0 | 299.4 | 293.4 | 293.3 | 293 | 4.3 | 0.51 | 0.51 | 10.1 |
| 2.5 | 298.2 | 300.6 | 293.5 | 293.4 | 293 | 4.3 | 0.54 | 0.51 | 10.8 |
| 3.0 | 298.4 | 301.6 | 293.7 | 293.6 | 293 | 4.3 | 0.53 | 0.53 | 10.8 |
| 3.5 | 298.6 | 302.5 | 293.8 | 293.7 | 293 | 4.2 | 0.53 | 0.52 | 10.4 |
| 4.0 | 298.8 | 303.4 | 293.9 | 293.9 | 293 | 4.2 | 0.54 | 0.52 | 11.0 |
| 4.5 | 299.0 | 304.1 | 294.0 | 294.1 | 293 | 4.4 | 0.53 | 0.53 | 10.7 |
| 5.0 | 299.2 | 304.8 | 294.1 | 294.2 | 293 | 4.0 | 0.53 | 0.51 | 10.7 |
| 5.5 | 299.3 | 305.4 | 294.3 | 294.4 | 293 | 4.4 | 0.55 | 0.54 | 10.0 |
| 6.0 | 299.5 | 305.9 | 294.4 | 294.6 | 293 | 4.4 | 0.54 | 0.51 | 10.0 |
| 6.5 | 299.6 | 306.4 | 294.5 | 294.8 | 293 | 4.4 | 0.55 | 0.50 | 10.4 |

FIG.7

| ITERATION (NUMBER OF CORRECTIONS) | REGRESSION EQUATION No. | LOSS FUNCTION |
|:---:|:---:|:---:|
| 1 | 1 | aa |
| 1 | 2 | bb |
| 1 | 3 | cc |
| 1 | 4 | aaa |
| 1 | 5 | bbb |
| 2 | 1 | ccc |
| 2 | 2 | aaaa (FIRST PLACE) |
| 2 | 3 | bbbb (SECOND PLACE) |
| 2 | 4 | cccc (THIRD PLACE) |

FIG.8

| RANK ORDER OF MODEL | LOSS FUNCTION | LINEAR REGRESSION EQUATION INFORMATION |
|:---:|:---:|:---:|
| 1 | aaaa | ----- |
| 2 | bbbb | ----- |
| 3 | cccc | ----- |

CPU 51

ROM 52

RAM 53

61

COMMUNI-
CATION I/F 54

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2022-074276, filed on Apr. 28, 2022; the entire contents of which are incorporated herein by reference.

FIELD

Embodiments described herein relate generally to an information processing device, an information processing method, and a computer program product.

BACKGROUND

As a predictive maintenance technique, there is a technique for making life prediction for a system to be monitored on the basis of monitoring data or a system-failure prediction model. As a technique for modeling a physical phenomenon, there is a technique for acquiring a mathematical model that describes the physical phenomenon from time-series data by applying a symbolic regression problem, which is a kind of machine learning.

BRIEF DESCRIPTION OF THE DRAWINGS

FIG. 4 is a diagram illustrating sub-library definition information;

FIG. 5 is a diagram illustrating generation probability information;

FIG. 6 is a diagram illustrating an example of sensor information;

FIG. 7 is a diagram illustrating a state of internal processing;

FIG. 8 is a diagram illustrating an output example of information on a linear regression equation;

FIG. 16 is a diagram illustrating a relation between causal phenomena and each indicator, for example;

FIG. 18 is a hardware configuration diagram of an information processing device.

DETAILED DESCRIPTION

Figure 1:
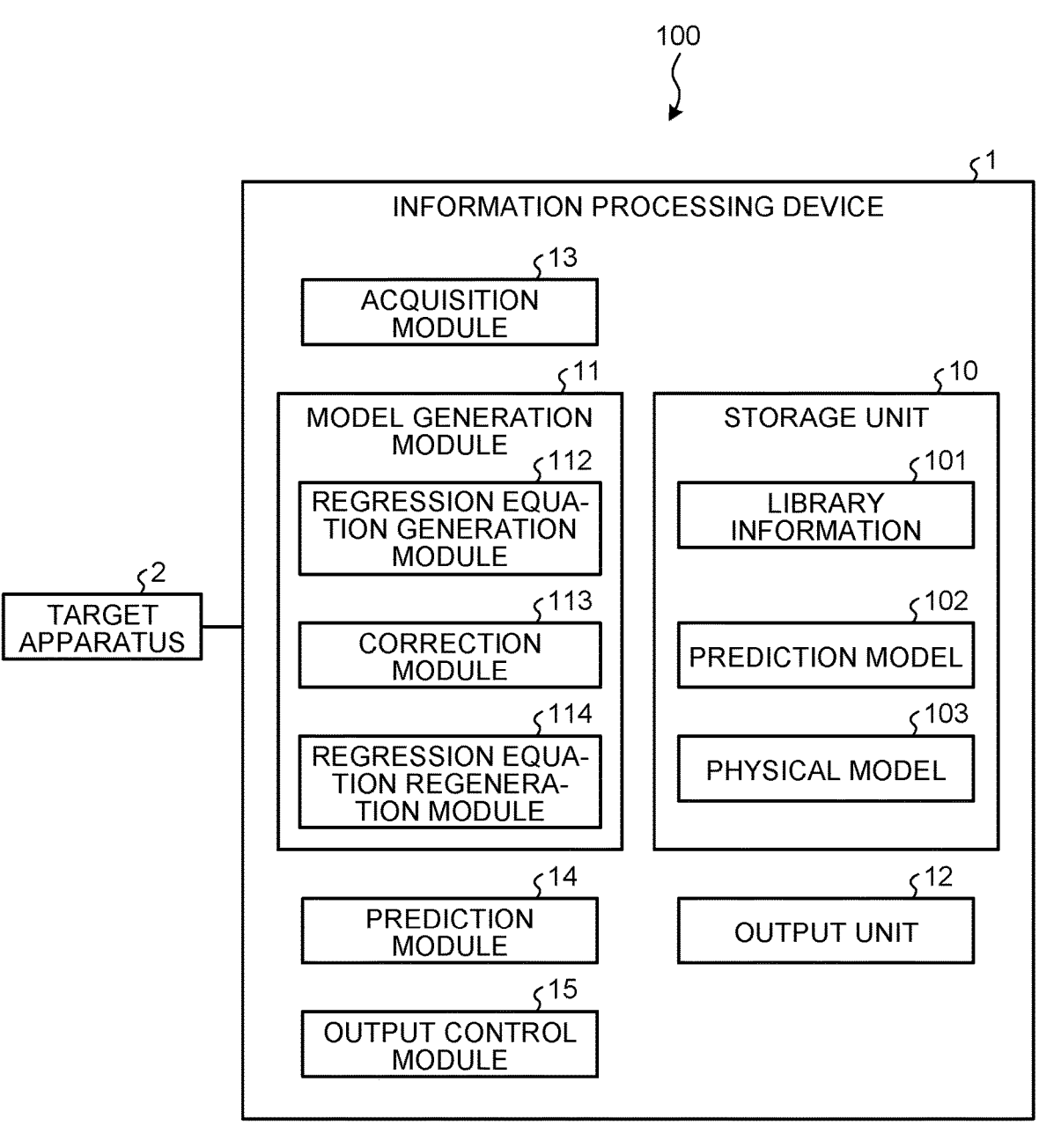
FIG. 1 is a schematic diagram illustrating an example of an information processing system.

In general, according to one embodiment, an information processing device includes a memory and one or more processors coupled to the memory. The one or more processors are configured to: generate, by machine learning using time-series data of a variable for a phenomenon related to an abnormality in a system to be monitored, a prediction model for predicting an indicator used to identify the a timing of system maintenance and a physical model for predicting the variable; and perform either one of a first prediction process using the physical model that is learned using the indicator predicted by the prediction model and a second prediction process of correcting the indicator predicted by the prediction model by using the variable predicted by the physical model.

Exemplary embodiments of an information processing device will be described below in detail with reference to the accompanying drawings. The present invention is not limited to the following embodiments.

Prediction techniques in conventional predictive maintenance (e.g., abnormality sign diagnosis and life prediction) have poor prediction accuracy due to the magnitudes of uncertainties in material strength, load calculations, and structural dimensions, for example, and need to be improved. The construction of prediction models and physical models (models of physical phenomena) for prediction indicators requires large amounts of training data and analysis data, and also significant engineering effort by experts. Furthermore, since there are many cases in which causes for results of predictions cannot be explained, it is desired that accountability be improved.

For example, when a fatigue life model is generated as a physical model, which model to apply needs to be determined by a person due to the complexity in fatigue damage and heat transfer phenomena, and there is a possibility that an appropriate physical model cannot be used.

In view of this, in the present embodiment, at least two models are generated and predictions are made using the two models. This enables the model-based prediction to be made with higher accuracy. Furthermore, in the present embodiment, each model can be generated by combining sub-libraries extracted from a plurality of types of sub-libraries. This enables the accountability of predictions based on a plurality of models with less engineering, into which domain knowledge and engineering knowledge are incorporated, to be improved, the accuracy of the predictions to be improved, and the models to be generated by learning with less data.

An information processing system (predictive maintenance system) according to the present embodiment mainly includes the following five constituent elements.

Constituent element E1: A prediction model for predicting indicators used to identify (grasp) the timing of maintenance in predictive maintenance (hereinafter, referred to as timing indicators). The prediction model may contain as a nested structure a physical model for predicting direct indicators of phenomena leading to a system failure (hereafter, referred to as direct indicators).

Constituent element E2: A physical model for predicting dependent variables (e.g., dependent variable vector X) for phenomena related to abnormalities in the system to be monitored. The dependent variables (physical models) may be of two or more types. The phenomena related to abnormalities in the system to be monitored are at least one of phenomena related to causes of phenomena leading to the system failure (hereinafter, referred to as "causal phenomena") and phenomena that appear indirectly with respect to the phenomena leading to the system failure (hereinafter, referred to as "indirect phenomena").

Constituent element E3: A function of generating the prediction model and the physical model as surrogate models.

Constituent element E4: A sub-library in which accumulates domain knowledge and engineering knowledge about the surrogate models are accumulated.

Constituent element E5: A function of acquiring monitoring data of dependent variables for the causal phenomena or the indirect phenomena.

Examples of the timing indicators include life, damage probability, breakage probability, failure probability, damage risk, breakage risk, and failure risk. Examples of the phenomena leading to the system failure include degradation phenomena, damage phenomena, breakage phenomena, and failure phenomena. Examples of the direct indicators include inelastic strain ranges, fracture mechanics parameters, and J-integral values, which are input variables (independent variables) for the prediction model. Examples of the causal phenomena include temperature and current. Examples of the indirect phenomena include abnormal heat generation and abnormal vibration phenomena that occur with the occurrence of damage such as cracks, abnormal friction, and wear.

The system failure is not only a state in which the system stops, but also includes a state in which the system or system components no longer meet the specified performance or functionality.

For example, in predictive maintenance of a power electronic system, the following indicator and models are used.

Timing Indicator: Life (fatigue life) required to identify when to replace components such as inverters (timing of maintenance).

Prediction model: A model for predicting life. It may include a physical model for predicting direct indicators such as inelastic strain ranges (life-indicator estimation model).

Physical model: A temperature estimation model for estimating temperature.

By using these, for example, the timing of maintenance can be determined based on the predicted life, and maintenance actions such as cleaning a cooler and repairing and replacing damaged parts can be performed.

A configuration example of the information processing system including the above-described constituent elements will be described.

FIG. 1 is a schematic diagram illustrating an example of this information processing system 100.

The information processing system 100 includes an information processing device 1 and a target apparatus 2. The information processing device 1 and the target apparatus 2 are connected to be able to exchange data or signals. Although one target apparatus 2 is illustrated in FIG. 1, the information processing system 100 may include two or more target apparatuses 2.

The target apparatus 2 is equipment including one or a plurality of components and driven by supplied electric power. The target apparatus 2 is applied to, for example, various apparatuses in which one or a plurality of electronic components are mounted in one rack. Specifically, the target apparatus 2 is applied to various apparatuses such as power electronics systems and rotating machinery systems like drive trains in wind power plants.

The target apparatus 2 includes one or more components and one or more sensors, for example. The components are, for example, apparatuses that are driven according to the supplied electric power. These apparatuses include heat-generating components that generate heat when driven according to the supplied electric power. Note that "drive" includes both an electric drive and a mechanical drive.

The heat-generating components are, for example, electronic circuits. Note that the heat-generating components may be any desired components that generate heat by being driven according to the supplied electric power, and are not limited to the electronic circuits.

Figure 2:
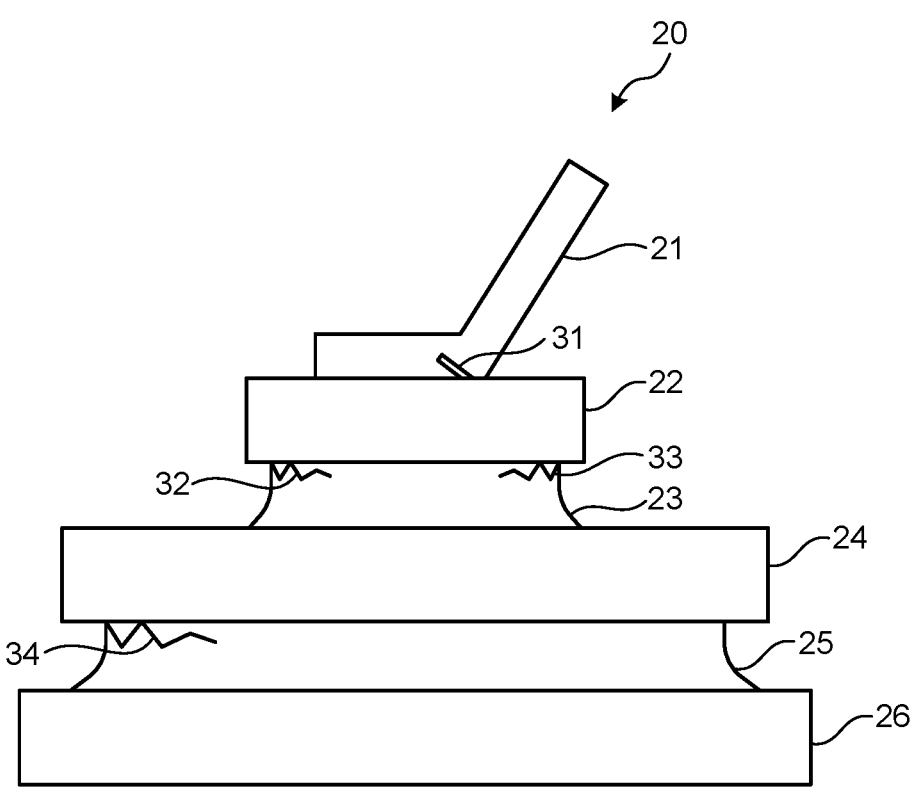
FIG. 2 is a diagram illustrating an example of a component.

FIG. 2 is a diagram illustrating an example of the components. A component 20 illustrated in FIG. 2 is, for example, a semiconductor device used in power electronic systems. The component 20 includes a substrate 26, a joining layer 25, a substrate 24, a joining layer 23, a chip 22, and a bonding wire 21. The joining layers 23, 25 are made of solder or sintered silver material, for example.

Figure 3:
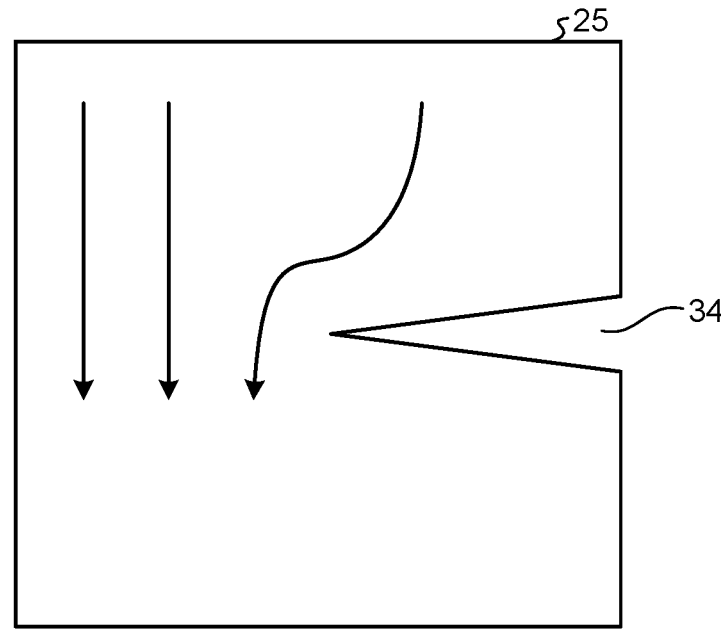
FIG. 3 is a diagram illustrating an example of change in temperature propagation when a crack has appeared.

In the component 20, cracks may appear due to heat generation or other causes. In FIG. 2, an example of the component 20 in which cracks 31 to 34 have appeared is illustrated. FIG. 3 is a diagram illustrating an example of change in temperature propagation when a crack has appeared. The crack 34 in the joining layer 25 may deteriorate the temperature propagation and cause abnormalities in temperature detected by the sensors, for example. The growth of the crack 34 may cause the component 20 to fail to meet the specified performance or functionality.

The components are not limited to heat-generating components, and may be components having a cooling function, which are formed with a metal block such as aluminum, for example.

The sensors measure, for example, physical quantities of environmental changes. For example, one or more positions (areas) to be measured are predetermined, and one or more sensors corresponding to the respective positions are provided. The following mainly describes an example in which a plurality of sensors are provided to measure physical quantities at positions P1 to P5. For example, the sensors detect the physical quantities of temperature, current, voltage, and wind speed at the positions P1 to P5, and output detection results as detection values. The physical quantity and the detected value are represented by numerical values indicating, for example, temperature, current, voltage, wind speed, and the like. Note that the physical quantities and the detection values may include pressure, rotation speed of an air cooling fan, and the like.

The sensors are, for example, a temperature sensor, a flow rate sensor, a current sensor, a voltage sensor, and the like.

The sensors may be arranged at positions inside a housing of the target apparatus 2 or outside the housing thereof where the environmental changes can be measured. The sensors may be built in the target apparatus 2 or may be externally attached to the target apparatus 2 only at the time of measurement.

The information processing device 1 has a function of generating prediction models and physical models using monitoring data of the target apparatus 2 detected by sensors, for example, and a function of making predictions in predictive maintenance using the prediction models and the physical models. The information processing device 1 and each of the sensors provided in the target apparatus 2 are connected to be able to exchange data or signals. Note that the information processing device 1 may be further connected to a target apparatus including various information processing devices other than the sensors mounted on the target apparatus 2 so that data or signals can be exchanged. For example, the information processing device 1 may be connected to the sensors and at least one of the components so that data or signals can be exchanged. Furthermore, the information processing device 1 is, for example, a server, a workstation, or the like.

For example, the information processing device 1 may collectively transmit data acquired from the sensors to a remote information processing device by a storage medium or a cloud.

Next, an example of a functional configuration of the information processing device 1 will be described.

As illustrated in FIG. 1, the information processing device 1 includes a storage unit 10, an acquisition module 13, a model generation module 11, a prediction module 14, an output control module 15, and an output unit 12. The model generation module 11 is connected to the storage unit 10 and the output unit 12 so that data or signals can be exchanged.

The storage unit 10 stores therein various types of data. The storage unit 10 is, for example, a storage medium such as a known hard disk drive (HDD). In the present embodiment, the storage unit 10 stores therein library information 101, a prediction model 102, and a physical model 103.

The library information 101 includes sub-libraries and other information used to generate the prediction model 102 and the physical model 103. The prediction model 102 and the physical model 103 are generated by the model generation module 11 using the library information 101 and stored in the storage unit 10.

The library information 101 is information including sub-library definition information that is information in which a plurality of types of sub-libraries including nonlinear basis functions are defined, and generation probability information that is information on generation probability of each of the nonlinear basis functions included in each sub-library.

First, the sub-library will be described with reference to FIG. 4. Each sub-library is a sub-library for generating linear regression equation that represents a thermal model. FIG. 4 is a diagram illustrating sub-library definition information. As illustrated in FIG. 4, the sub-libraries include a heat conduction sub-library, a radiation sub-library, a forced convection sub-library, a natural convection sub-library, and a heat generation sub-library. Each sub-library includes one or a plurality of nonlinear basis functions. Note that the sub-library is not limited to one illustrated in FIG. 4, and a phase-change sub-library that considers a phase change may be defined.

$T_1$ and $T_j$ illustrated in FIG. 4 are temperatures at any of the positions P1 to P5. Furthermore, $\Delta T$ and $\Delta T_{i-j}$ are temperature differences between two points. v is a velocity (wind speed). V is a voltage. $i_1$ and $i_2$ are currents. Thus, the sub-libraries include nonlinear basis functions based on a dependent variable (temperature) and independent variables (velocity, current and voltage).

As illustrated in FIG. 4, each sub-library includes one or more nonlinear basis functions. Furthermore, the forced convection sub-library and the natural convection sub-library include the nonlinear basis functions having different exponents.

In the above thermal model, an energy conservation law that holds for a node (temperature measurement point) is expressed by a node equation illustrated in the following equation (1).

$$\sum_{\substack{j=1 \\ j\neq i}}^{N} \frac{1}{R_{ij}^{(m)}}\left(T_i^{(m)} - T_j^{(m)}\right) = Q_i^{(m)} - \frac{C_i^{(m)}}{\Delta t}\left(T_i^{(m)} - T_i^{(m-1)}\right) \qquad (1)$$

In the above equation (1), R is thermal resistance, T is temperature, Q is calorific value, and $\Delta t$ is time interval. Furthermore, m is a subscript of time.

When the above equation (1) is transformed, the following equation (2) is obtained.

$$\frac{1}{\Delta t}\left(T_i^{(m)} - T_i^{(m-1)}\right) = \frac{dT}{dt} = \frac{1}{C_i^{(m)}}\left\{Q_i^{(m)} - \sum_{\substack{j=1 \\ j\neq i}}^{N} \frac{1}{R_{ij}^{(m)}}\left(T_i^{(m)} - T_j^{(m)}\right)\right\} \qquad (2)$$

As shown by the right side of the equation (2), if a nonlinear basis function indicating Q/C and $\Delta T/RC$ can be prepared, an appropriate linear regression equation can be derived. When dimensions and physical properties do not change, such as in maintenance operations, the nonlinear basis functions of the heat conduction sub-library, the radiation sub-library, the forced convection sub-library, and the natural convection sub-library are proportional to $\Delta T/RC$. Furthermore, the heat generation sub-library is proportional to Q/C. The information processing device 1 of the present embodiment generates the linear regression equation according to the thermal model by using the sub-libraries defined in the sub-library definition information.

The library information 101 further includes the information on the generation probability, which is a probability of being selected from the nonlinear basis functions included in the same sub-library.

Subsequently, the generation probability will be described with reference to FIG. 5. FIG. 5 is a diagram illustrating generation probability information. As illustrated in FIG. 5, the sub-library, the exponent, and the generation probability are associated with each other.

Returning to FIG. 1, the acquisition module 13 acquires various types of information to be use in the information processing device 1. For example, the acquisition module 13 acquires time-series data (monitoring data) of variables for phenomena related to abnormalities in the system to be monitored. Examples of the monitoring data include detection results (sensor information) from a plurality of sensors. Thus, the acquisition module 13 acquires the detection results detected by the sensors. For example, the acquisition module 13 acquires the detection results of measuring at predetermined time intervals the temperatures at the positions P1 to P5, the wind speed at the position P5, the currents at the positions P1 and P2, and the voltage at the position P1. Note that the acquisition module 13 may acquire information on the rotation speed and voltage of the air cooling fan, and calculate the wind speed on the basis of the information.

Here, an example of data acquired by the acquisition module 13 is illustrated in FIG. 6. FIG. 6 is a diagram illustrating an example of sensor information. As illustrated in FIG. 6, for example, the data measured every 0.5 seconds is acquired. Temp1 to Temp5 illustrated in FIG. 6 are the temperatures at the positions P1 to P5. v illustrated in FIG. 6 is the wind speed at the position P5. $i_1$ and $i_2$ are the currents at the positions P1 and P2. V illustrated in FIG. 6 is the voltage at the position P1. Note that the acquisition module 13 may register the acquired detection result in the storage unit 10.

Returning to FIG. 1, the model generation module 11 generates a prediction model 102 and a physical model 103 by machine learning using the monitoring data acquired by the acquisition module 13.

The model generation module 11 generates each of the prediction model 102 and the physical model 103 by, for example, combining one or more nonlinear basis functions extracted based on generation probabilities from a plurality of types of sub-libraries. In this way, the model generation module 11 can generate the prediction model 102 and the physical model 103 by the same procedure using the library information 101. The following mainly describes an example of generating a linear regression equation that represents a thermal model as an object model that is either of the prediction model 102 and the physical model 103. Applicable models are not limited to the thermal model.

The method of generating the prediction model 102 and the physical model 103 is not limited to a method using the library information 101, and may be any method. Thus, the information processing device 1 does not have to include the constituent element E4. When the prediction model 102 and the physical model 103 generated in advance can be used, for example, the information processing device 1 does not have to include the model generation module 11 (constituent element E3).

The prediction module 14 performs one of the following two types of prediction processes.

Prediction process PA (first prediction process): A prediction using a physical model 103 that is learned using indicators (timing indicators) predicted by the prediction model 102.

Prediction process PB (second prediction process): A prediction in which indicators (timing indicators) predicted by the prediction model 102 are corrected using variables predicted using the physical model 103.

The prediction process PA is, for example, a prediction using the physical model 103 generated by combining nonlinear basis functions extracted based on generation probabilities corrected using timing indicators predicted by the prediction model 102. The prediction process PB includes processes of predicting timing indicators using the prediction model 102 and correcting the timing indicators predicted by the prediction model 102 using relational information indicating a relation between each dependent variable predicted by the physical model 103 and the corresponding timing indicator.

The relational information is, for example, a database (hereafter, referred to as a relational database) that associates causes (dependent variables for phenomena related to system abnormalities) with the distribution of timing indicators (distribution of life, distribution of damage values, etc.). The relational database is stored, for example, in the storage unit 10.

For example, the relational database is data or a model (e.g., relational equations, tables, and mathematical models that indicate a relation) describing a relation between a dependent variable (dependent variable vector X) and life (e.g., the number of life cycles, time, breakage probability) for a causal or indirect phenomenon.

The prediction module 14 can predict the monitoring data of the dependent variable for the causal or indirect phenomenon by the physical model 103. The prediction module 14 can also predict life by the predicted dependent variable and the relational database.

For example, in the case of fatigue failure of a joint of the target apparatus 2, the degree of increase in thermal resistance at a target area changes depending on the length of crack growth (hereinafter, referred to as "crack growth length"), and the temperature distribution changes with respect to the case in which no cracks exist. Examples of the relation between life and cause includes a relation between thermal resistance increase and crack growth length. For example, the prediction module 14 can calculate the crack growth length and the life from change in the coefficient of a term related to the thermal resistance to be monitored, using a relational database that indicates the relation between life and cause.

In this way, the prediction module 14 can predict a timing indicator (e.g., life) using the physical model 103 and the relational database.

The prediction module 14 can also predict life, using a physical model included in the prediction model 102 (a physical model for predicting direct indicators). For example, in the case of fatigue failure of a joint of the target apparatus 2, the prediction module 14 can predict the life distribution, using a life rule, a crack growth rule, and a cumulative damage rule from surrogate models of fracture mechanics indicators such as inelastic strain ranges and J integral values, which are direct indicators, and probability models.

In this case, for example, when the joint is at risk of fatigue failure, the prediction results of the life of the joint may be used to change the generation probability of a basis function of a sub-library for change in contact thermal resistance related to crack growth in the joint, depending on the magnitude of the cumulative damage value in the joint. The temperature estimation model (physical model 103) can be generated by using the changed generation probability. This enables the physical model 103 to be highly accurate. The prediction process using the physical model 103 thus generated corresponds to the prediction process PA described above.

The prediction process of correcting a timing indicator (life) predicted by the prediction model 102, using the timing indicator predicted using the physical model 103 and the relational database, corresponds to the prediction process PB described above. The prediction process PB is a process that utilizes a Bayesian model to improve the accuracy of prediction, for example, from information about the timing indicator (life) calculated using each of the prediction model 102 and the physical model 103.

The output control module 15 controls outputs of various types of information to be used in the information processing device 1. For example, the output control module 15 outputs to the output unit 12 information about models generated by the model generation module 11 and results predicted by the prediction module 14.

The above-described respective components (the model generation module 11, the acquisition module 13, the output control module 15, and the prediction module 14) are implemented by, for example, one or a plurality of processors. For example, each of the above components may be implemented by causing the processor such as the CPU to execute a computer program, that is, by software. Each of the above components may be implemented by the processor such as a dedicated IC, that is, by hardware. Each of the above components may be implemented by using software and hardware in combination. When the processors are used, each processor may implement one of the components, or may implement two or more of the components.

The output unit 12 outputs various types of information in response to control by the output control module 15. For example, the output unit 12 outputs information about the generated models and the results predicted by the models.

The output unit 12 includes at least one of a display function for displaying various information and a communication function for communicating data with an external apparatus. The external apparatus is an apparatus provided outside the target apparatus 2. The target apparatus 2 and the external apparatus may be able to communicate with each other via a network or the like. For example, the output unit 12 is configured by combining at least one of a known display device and a known communication device.

The following describes details of the model generation module 11.

The model generation module 11 includes a regression equation generation module 112, a correction module 113, and a regression equation regeneration module 114.

The regression equation generation module 112 generates a plurality of regression equations. Specifically, the regression equation generation module 112 first differentiates each of Temp1 to Temp5 acquired at the corresponding time, by time. Furthermore, the regression equation generation module 112 generates matrix data in which each piece of data acquired by the acquisition module 13 is input to the nonlinear basis function in each sub-library. In this way, the regression equation generation module 112 calculates using the detection result of the sensor and the nonlinear basis functions.

Subsequently, the regression equation generation module 112 extracts nonlinear basis functions from the sub-libraries including the nonlinear basis functions on the basis of the generation probabilities, and generates the linear regression equations for calculating each of Temp1 to Temp5 by combining the nonlinear basis functions of the plurality of types of sub-libraries.

When extracting a nonlinear basis function from the sub-library including the nonlinear basis functions on the basis of the generation probability, the regression equation generation module 112 preferentially extracts the exponent having a high generation probability of the generation probability information.

Subsequently, the regression equation generation module 112 determines coefficients of the linear regression equations by sparse estimation of a known technique. For example, the regression equation generation module 112 determines the coefficients by the least squares method, and then sets the coefficient equal to or less than a predetermined threshold value (hyperparameter) to 0. Furthermore, the regression equation generation module 112 updates the coefficient by performing the least squares method again with a candidate function (nonlinear basis function) having the remaining non-zero coefficient, and sets the coefficient equal to or less than the predetermined threshold value to 0. Note that the regression equation generation module 112 repeats a plurality of times a process of updating the coefficient by performing the least squares method again with the candidate function and of setting the coefficient equal to or less than the threshold value to 0.

Note that the regression equation generation module 112 may determine a coefficient by other known machine learning in addition to determining the coefficients by sparse estimation.

Furthermore, the regression equation generation module 112 calculates loss functions using the linear regression equations and a result of the above calculation. A method for calculating the loss functions is implement by a known method. For example, the regression equation generation module 112 generates the loss functions based on an error between a result of inputting the matrix data, which is obtained by inputting each piece of data acquired by the acquisition module 13 to the nonlinear basis function in each sub-library, to the generated linear regression equations, and a result of differentiating each of Temp1 to Temp5 at the corresponding time, by time. Note that the regression equation generation module 112 may calculate the loss functions based on not only the above-described error but also a degree of simplicity of the equation.

If conditions described later are not met, the correction module 113 corrects the hyperparameter and the generation probabilities used when determining the coefficients of the linear regression equations on the basis of the loss functions of the linear regression equations. The method for correcting the hyperparameter may be a method of the related art (for example, a method described in S. L. Brunton, J. L. Proctor, J. N. Kutz, "Discovering governing equations from data by sparse identification of nonlinear dynamical systems", Proc. Natl. Acad. Sci., 113 (2016), pp. 3932-3937). The correction module 113 adds a value to the hyperparameter when the loss function of each linear regression equation falls below a predetermined threshold value. In contrast, the correction module 113 subtracts a value from the hyperparameter when the loss function of each linear regression equation is equal to or more than the threshold value.

The correction module 113 increases the generation probability of the sub-library that constitutes the linear regression equation of the smallest loss function among the loss functions of the linear regression equations generated by the same hyperparameter, and reduces the generation probability of other sub-libraries. Note that as a method for correcting the generation probability, for example, the generation probability of the sub-library having a high generation probability may be further increased. That is, the generation probability may be corrected so as to narrow down the nonlinear basis function to be extracted.

The regression equation regeneration module 114 extracts nonlinear basis functions from the sub-libraries including the nonlinear basis functions on the basis of the generation probabilities after correction by the correction module 113, generates linear regression equations obtained by combining the nonlinear functions of the plurality of types of sub-libraries, estimates coefficients of the linear regression equations by sparse estimation using the hyperparameter corrected by the correction module 113, and calculates loss functions of the linear regression equations.

If the regression equation regeneration module 114 has not generated the linear regression equation for a predetermined number of times, the correction module 113 corrects the hyperparameter and the generation probabilities again. Then, the regression equation regeneration module 114 calculates the loss functions of the linear regression equations on the basis of the hyperparameter and the generation probabilities that have been corrected again. In this way, the model generation module 11 corrects the hyperparameter and the generation probabilities for the predetermined number of times, and calculates the loss functions using the hyperparameter and the generation probabilities that have been corrected.

When a plurality of models (the prediction model 102 and the physical model 103) are generated by using a shared sub-library as in the present embodiment, the generation probabilities and the hyper-parameter that are used in a shared manner can be corrected in generation of each model. Thus, the respective models can be generated with higher accuracy.

The correction module 113 may correct at least one of the generation probabilities and the hyperparameter using the prediction results of the models. For example, the correction module 113 may use the indicators (timing indicators) predicted by the prediction model 102 in the prediction process to correct the generation probabilities of the sub-libraries that contribute to the indicators. More specifically, the correction module 113 can also correct the generation probabilities to increase the generation probability of a nonlinear basis function having a greater influence on the indicators than the other nonlinear basis functions among the nonlinear basis functions. The prediction model 102 and the physical model 103 are then further regenerated using these generation probabilities. The prediction process using the physical model 103 thus regenerated corresponds to the prediction process PA described above.

The output control module 15 outputs a linear regression equation selected from the linear regression equations to the output unit 12 if a predetermined condition is met. Examples of this condition include the number of times the regression equation regeneration module 114 has generated the linear regression equations. Furthermore, the above condition may be that the loss functions of the linear regression equations calculated by the regression equation generation module 112 or the loss functions of the linear regression equations calculated by the regression equation regeneration module 114 is equal to or less than the threshold value.

Furthermore, the output control module 15 outputs information on the linear regression equations selected by a rank order based on the loss functions of the linear regression equations to the output unit 12. Here, an example in which the output control module 15 outputs the linear regression equations will be described with reference to FIG. 7 and FIG. 8.

FIG. 7 is a diagram illustrating a state of internal processing. Specifically, FIG. 7 is a diagram in which the number of iterations (number of corrections) for the linear regression equations generated by the regression equation regeneration module 114, a regression equation No. indicating an identification number of the linear regression equation, and the loss function are associated with each other.

As illustrated in FIG. 7, the loss function "aaaa" of the linear regression equation in which "the number of iterations" is "2" and the "regression equation No." is "2" is the first place (a value indicated by the loss function is the smallest), the loss function "bbbb" of the linear regression equation in which "the number of iterations" is "2" and the "regression equation No." is "3" is the second place, and the loss function "cccc" of the linear regression equation in which "the number of iterations" is "2" and the "regression equation No." is "4" is the third place.

FIG. 8 is a diagram illustrating an output example of the information on the linear regression equation. The output control module 15 outputs the loss function and linear regression equation information to the output unit 12 on the basis of the rank order of the loss function illustrated in FIG. 7. Here, the linear regression equation information is information indicating the linear regression equation, such as information indicating a simultaneous equation of nodes and a linear combination of the basis functions. Note that the output control module 15 may output the linear regression equation information on a separate screen.

Note that the output control module 15 may select the linear regression equation having the smallest loss function among the linear regression equations.

Note that the output control module 15 may transmit and output the selected linear regression equation to another information processing device. Thus, the other information processing device can perform temperature prediction calculation using the linear regression equation.

Next, a flow of a model generation process performed by the information processing device 1 will be described.

Figure 9:
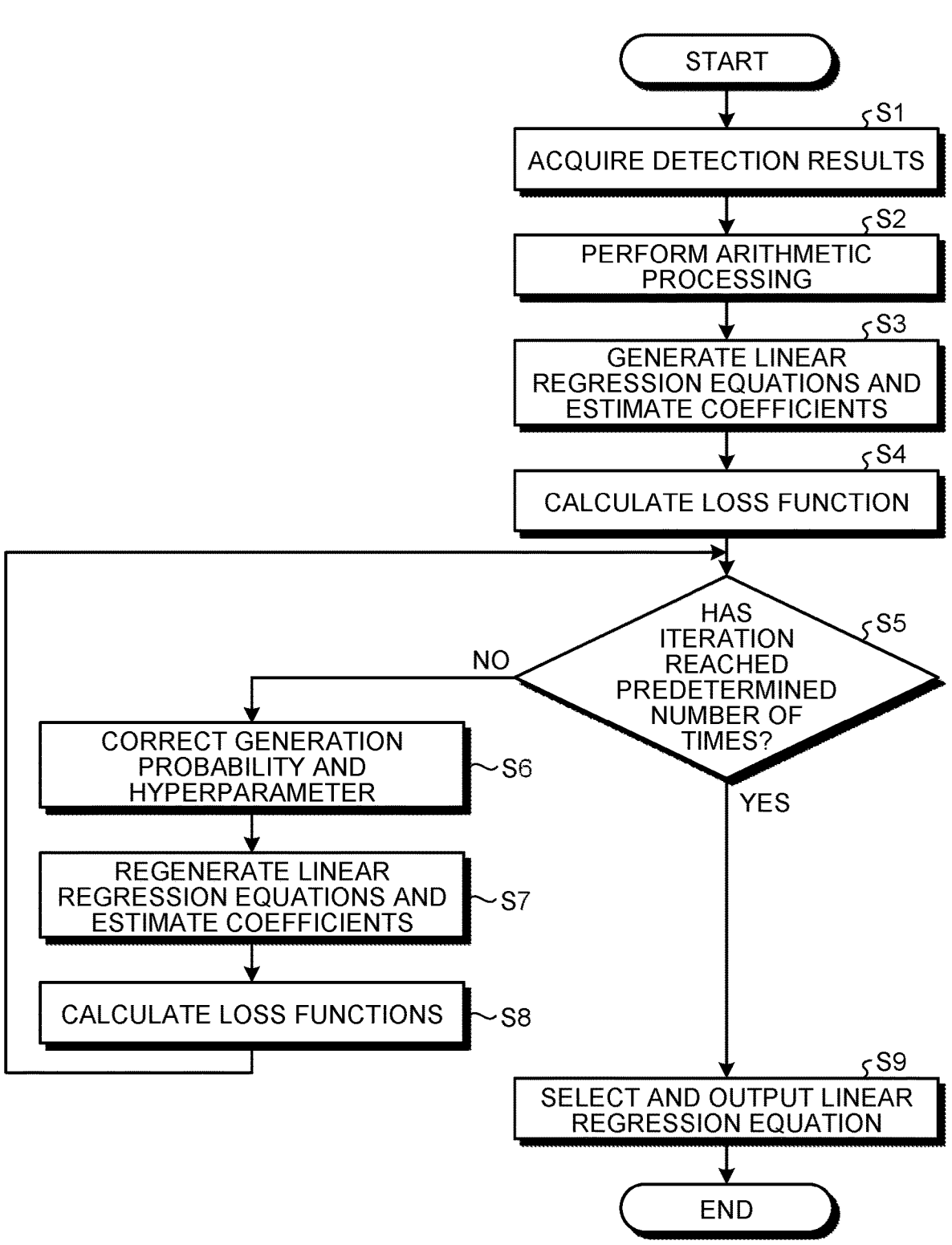
FIG. 9 is a flowchart of a model generation process.

FIG. 9 is a flowchart illustrating an example of the flow of the model generation process performed by the information processing device 1. The model generation process can be applied to both the generation of the prediction model 102 and the generation of the physical model 103.

The acquisition module 13 acquires the detection results of the sensors (Step S1). Subsequently, the regression equation generation module 112 uses the detection results of the sensors to differentiate each of Temp1 to Temp5 acquired at the corresponding time, by time, and to generate the matrix data in which each piece of data acquired by the acquisition module 13 is input to the nonlinear basis function in each sub-library. In this way, the regression equation generation module 112 performs arithmetic processing of the nonlinear basis function using the detection results of the sensors (Step S2).

The regression equation generation module 112 extracts the nonlinear basis function from the sub-library including the nonlinear basis functions on the basis of the generation probability, and generates the linear regression equations for calculating each of Temp1 to Temp5 by combining the nonlinear basis functions of the plurality of types of sub-libraries. Furthermore, the regression equation generation module 112 determines the coefficients of the linear regression equations by sparse estimation (Step S3).

The regression equation generation module 112 calculates the loss function using the linear regression equations and the result of the above calculation (Step S4). If the linear regression equation has not been generated for the predetermined number of times (No at Step S5), the correction module 113 corrects the generation probability and the hyperparameter on the basis of the loss function of the linear regression equation (Step S6). For example, the correction module 113 adds a value to the hyperparameter when the loss function of each linear regression equation falls below the predetermined threshold value. The correction module 113 increases the generation probability of the sub-library that constitutes the linear regression equation of the smallest loss function among the loss functions of the linear regression equations generated by the same hyperparameter, and reduces the generation probability of the other sub-libraries.

The regression equation regeneration module 114 extracts the nonlinear basis function from the sub-library including the nonlinear basis functions on the basis of the generation probability after correction by the correction module 113, generates the linear regression equations combining the nonlinear functions of the plurality of types of sub-libraries, and estimates the coefficients of the linear regression equations by sparse estimation using the hyperparameter corrected by the correction module 113 (Step S7). Furthermore, the regression equation regeneration module 114 calculates the loss functions of the linear regression equations (Step S8), and proceeds to Step S5.

In Step S5, when the regression equation regeneration module 114 generates the linear regression equation for the predetermined number of times, the output control module 15 outputs the linear regression equation selected from the linear regression equations to the output unit 12 (Step S9). Then, this routine is terminated.

Figure 10:
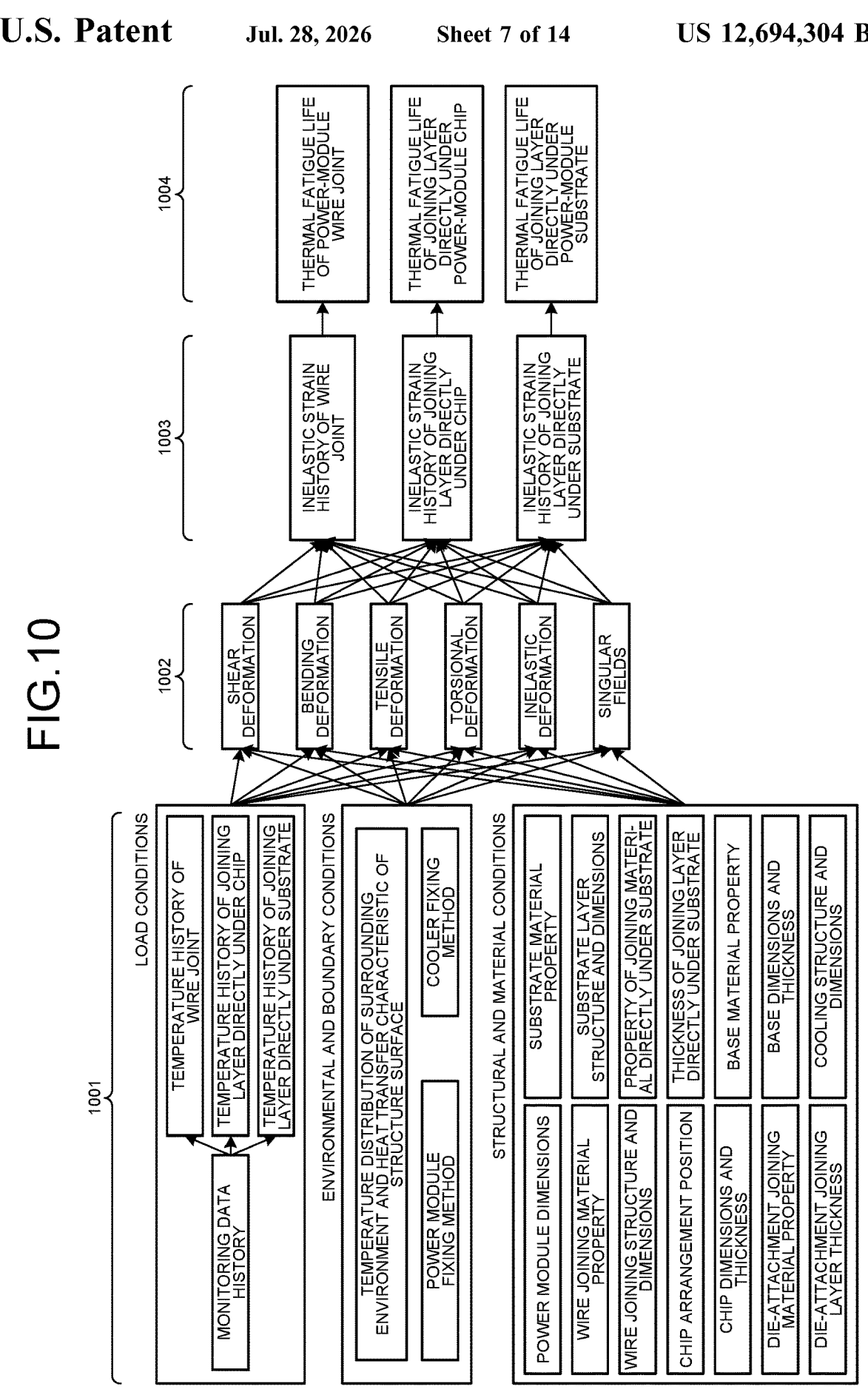
FIG. 10 is a diagram illustrating a relation between causal phenomena and each indicator, for example.

The following describes an example of predictive maintenance to which the present embodiment can be applied. FIG. 10 is a diagram illustrating a relation between causal phenomena and each indicator, for example, when fatigue failure in a joint of the target apparatus 2 used in a power electronics system is predicted. Specifically, FIG. 10 illustrates an example of a relation among factors 1001, sub-library basis functions 1002, direct indicators 1003, and timing indicators 1004 related to fatigue failure.

The direct indicators 1003 include histories of inelastic strain ranges (inelastic strain histories) of a wire joint, a joining layer directly under a chip, and a joining layer directly under a substrate. The wire joint, the joining layer directly under the chip, and the joining layer directly under the substrate are examples of positions (areas) to be measured. The sub-library basis functions 1002 include nonlinear basis functions for shear deformation, bending deformation, tensile deformation, torsional deformation, inelastic deformation, and singular fields. The related factors 1001 include factors related to load conditions, environmental and boundary conditions, and structural and material conditions as illustrated in FIG. 10.

The surrogate model (prediction model 102) includes factors and basis functions generated by combinations of nonlinear basis functions for the factors. Here, the probability model for each indicator may be used to construct the prediction model 102 for the corresponding timing indicator.

For example, a model into which any of the sub-library basis functions 1002 are combined corresponds to the physical model for predicting the direct indicators 1003 (the physical model included in the prediction model 102). The prediction model 102 inputs each direct indicator output by this physical model and outputs life that is the corresponding timing indicator 1004.

The surrogate model is not limited to a regression equation generated by combining nonlinear basis functions, and may be a model of:

Deep Learning Neural Network;

Lagrangian/Hamiltonian Neural Network;

Galerkin Proper Orthogonal Decomposition (Galerkin PoD);

Dynamic Mode Decomposition (DMD);

Response Surface Model; and

Hierarchical Bayesian Model.

The surrogate model obtained by approximating simulation result data or sensor signal data by machine learning may be a model of:

Thermal network model;

Fluid network model;

Electric network model (including control circuits); and

Dynamic 1DCAE models (e.g., mechanical torque response to rotations and vibrations including damping, nonlinear deformation response to loads)

Systems to which the present embodiment can be applied are not limited to power electronic systems. The present embodiment can be applied to wind power plants, for example. In the case of life prediction for a wind power plant, for example, the stress ranges and the inelastic strain ranges of drive train bearings, welds, and bolted joints due to wind and seismic load variations are direct indicators.

Examples of phenomena (causal and indirect phenomena) related to abnormalities in a system to be monitored will be described. The examples include, in the case of fatigue failure in joints of the target apparatus 2, a phenomenon in which the thermal resistance increases with crack growth, resulting in abnormal ambient temperature. In the case of breakage in the wind power plant, the examples include damage to drive train bearings and welds, abnormal vibration or abnormal deformation phenomena caused by loosening of screws in bolted joints, and a phenomenon of abnormal ambient temperature due to severe frictional wear of the bearings.

Examples of monitoring data (dependent variables) to be acquired will be described. For example, in the case of fatigue failure in joints of the target apparatus 2, the phenomenon of abnormal ambient temperature occurs as described above, and thus the acquisition module 13 acquires time-series data of temperature as monitoring data.

In the case of the breakage in the wind power plant, abnormal vibration or abnormal deformation phenomena occur as described above, and thus the acquisition module 13 acquires the time-series data of camera images and the time-series data of detection results of displacement sensors, acceleration sensors, and strain sensors, for example, as monitoring data. In the case of the phenomenon of abnormal ambient temperature due to severe frictional wear of the bearing, the acquisition module 13 monitors the time-series data of temperature.

Figure 11:
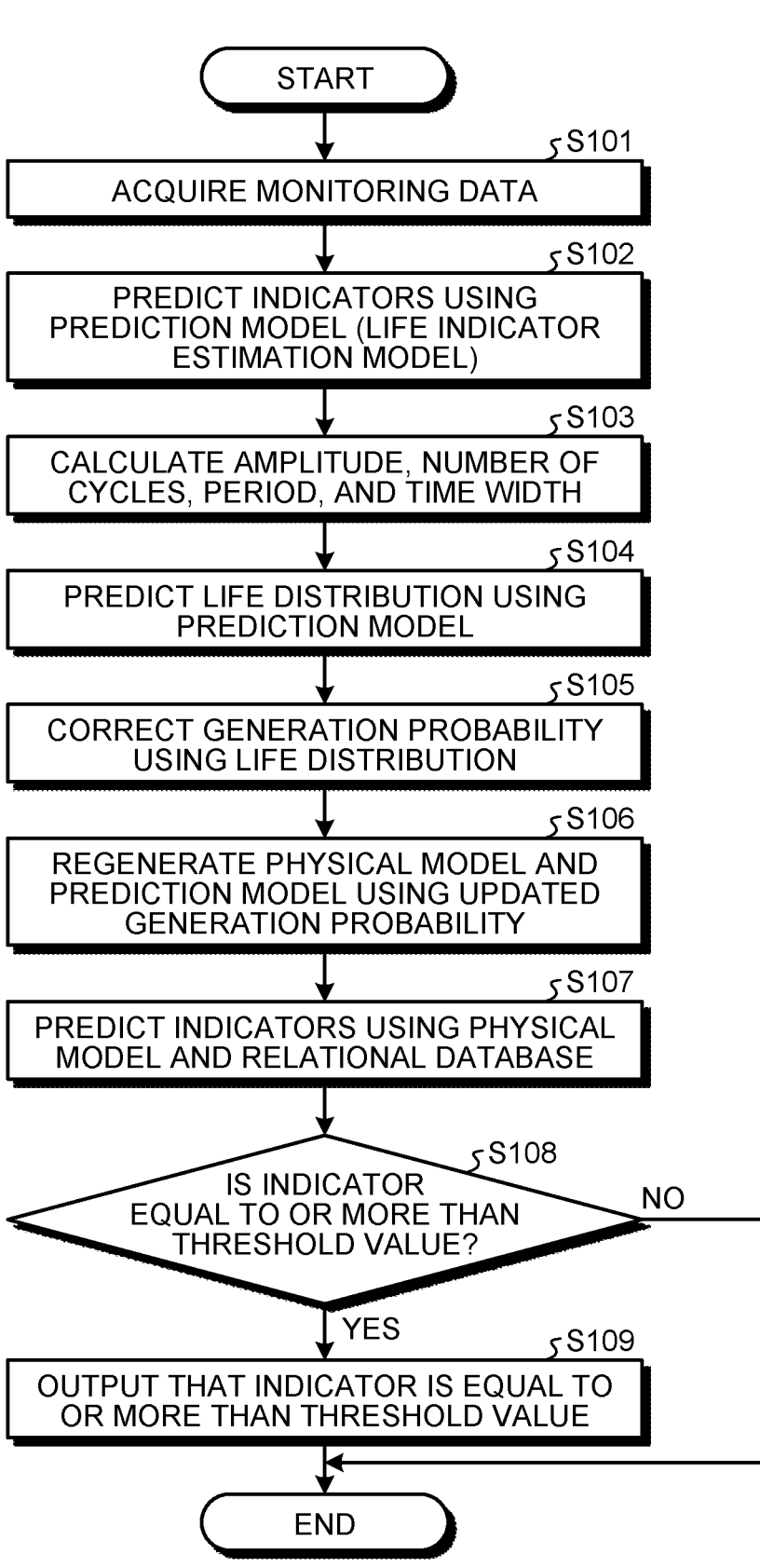
FIG. 11 is a flowchart of a prediction process.

The following describes flow of the prediction process by the prediction module 14. The prediction process may be performed using a pre-generated model (e.g., the model generated by the model generation process in FIG. 9) or may be performed in parallel with the model generation process. Hereinafter, the prediction processes PA and PB will be described separately. FIG. 11 is a flowchart illustrating an example of the prediction process PA.

The acquisition module 13 acquires monitoring data that is time-series data of the detection results of the sensors (Step S101). The prediction module 14 predicts timing indicators using the prediction model 102 (Step S102). Here, life is predicted as each timing indicator by the life-indicator estimation model included in the prediction model 102.

Figure 12:
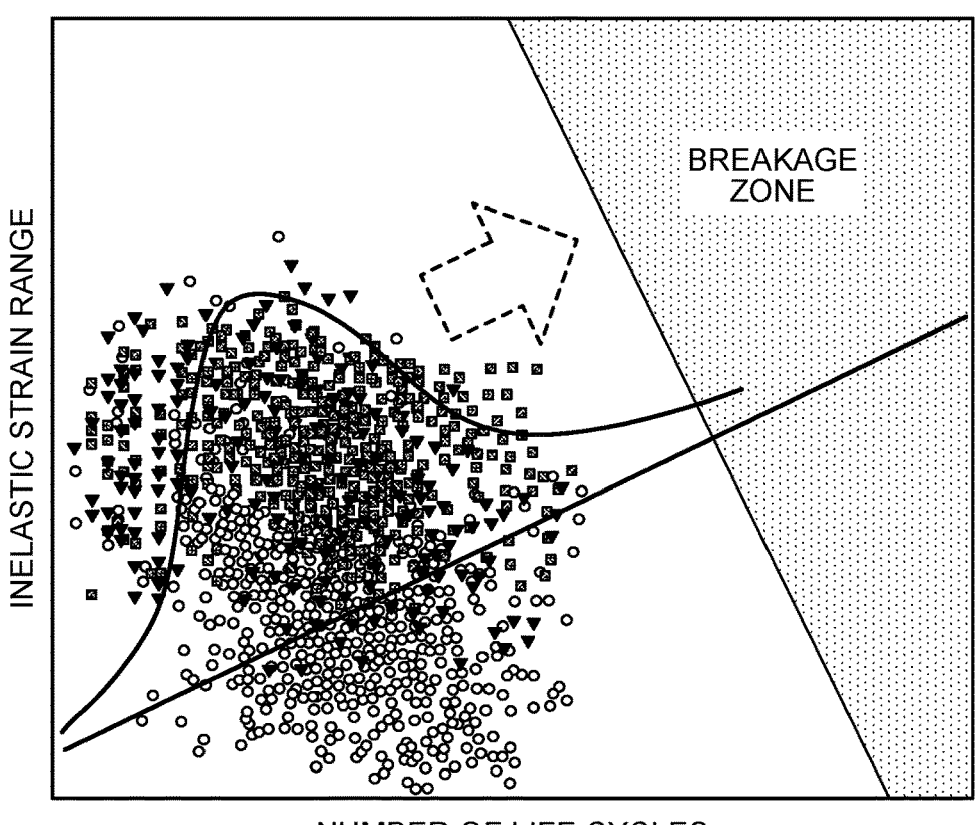
FIG. 12 is a diagram illustrating an example of life distribution obtained by prediction.

The prediction module 14 calculates an amplitude (e.g., inelastic strain range), the number of cycles, a period, and a time width for the monitoring data using the cycle counting method (Step S103). The prediction module 14 predicts the life distribution using the prediction model 102 according to the amplitude, the number of cycles, the period, and the time width calculated (Step S104). FIG. 12 is a diagram illustrating an example of life distribution obtained by the prediction.

Returning to FIG. 11, the correction module 113 corrects the generation probability of the sub-library using the life distribution (Step S105). For example, if the contribution of the life-indicator estimation model to damage is significant, the correction module 113 may increase the generation probability of the sub-library used in the life-indicator estimation model. If the contribution of the life-indicator estimation model to damage is not significant, for example, this step of correcting the generation probability and Step S106 of regenerating the model using the corrected generation probability do not have to be performed.

The correction module 113 may correct the generation probability according to the magnitude of the cumulative damage value for each area obtained from the output of the physical model for predicting direct indicators (e.g., the life-indicator estimation model). For example, as described above, in the case of the fatigue failure in joints of the target apparatus 2, there is a possibility that the thermal resistance increases with crack propagation and a phenomenon of abnormal ambient temperature occurs. Thus, the correction module 113 may correct the generation probability of a basis function for contact thermal resistance in an area in which the cumulative damage value is high. The corrected generation probability can be reflected in the subsequent generation of the physical model 103.

Specifically, the model generation module 11 regenerates the physical model 103 and the prediction model 102 using the corrected generation probability (Step S106). Note that here the generation probability is corrected according to the output of the physical model for predicting the direct indicators, and the models are regenerated. The model generation module may be configured to, along with such processing, correct the generation probability and the like by the model generation process illustrated in FIG. 9 and regenerate the respective models.

The prediction module 14 predicts the timing indicator using the regenerated physical model 103 and the relational database (Step S107). For example, the prediction module 14 uses the physical model 103 to predict dependent variables for to phenomena related to abnormalities in the system to be monitored, and uses the relational database to obtain timing indicators corresponding to the predicted dependent variables.

The prediction module 14 determines whether each timing indicator thus obtained is equal to or more than a threshold value for the indicator (Step S108). The threshold value for the indicator is a value used to determine whether an action for predictive maintenance is required. For example, predictive maintenance is determined to be required when the timing indicator is equal to or more than the threshold value. The threshold values for indicators are stored, for example, in the storage unit 10.

If the timing indicator is less than the threshold value (No at Step S108), the prediction process ends because it corresponds to a case in which predictive maintenance is unnecessary.

If the timing indicator is equal to or more than the threshold value (Yes at Step S108), the output control module 15 outputs that the timing indicator is equal to or more than the threshold value (Step S109) and ends the prediction process.

Figure 13:
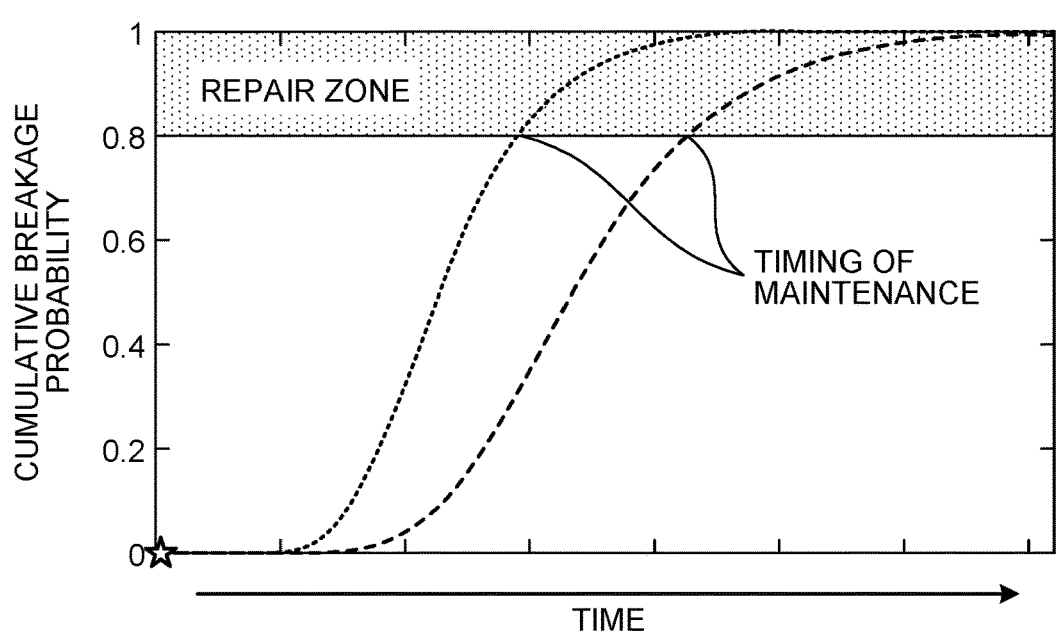
FIG. 13 is a diagram illustrating an example of a display screen.

The method of outputting the prediction results is not limited to that described above. For example, the output control module 15 may output a display screen to the output unit 12 (display function) to determine whether predictive maintenance is required. FIG. 13 is a diagram illustrating an example of the display screen.

Figure 14:
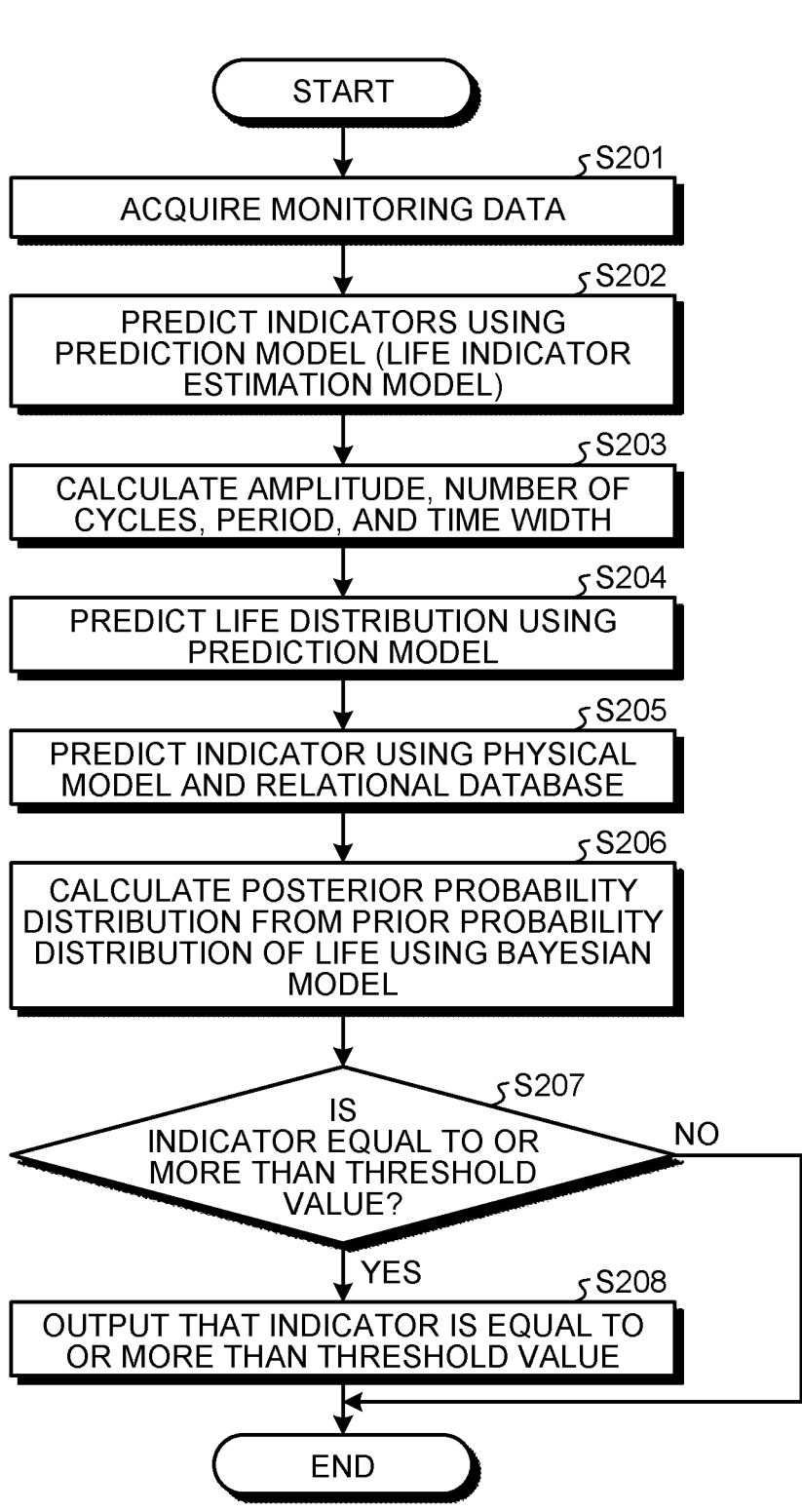
FIG. 14 is a flowchart of a prediction process.

FIG. 14 is a flowchart illustrating an example of the prediction process PB.

Steps S201 to S204 are the same as Steps S101 to S104 in FIG. 11 (the prediction process PA), and thus description thereof is omitted.

In the prediction process PB, the prediction module 14 predicts the timing indicator using the physical model 103 and the relational database (Step S205). This process is the same as Step S107 in FIG. 11.

The prediction module 14 calculates the posterior probability distribution from the prior probability distribution of life using the Bayesian model (Step S206). The prior probability distribution of life is the life distribution calculated at Step S204. For example, the prediction module 14 uses the timing indicator obtained at Step S205 as a likelihood, and calculates the posterior probability distribution based on multiplication of the prior probability distribution by the likelihood. This enables a life distribution to be obtained, which is more accurate than a life distribution that is the prior probability distribution, for example.

When a plurality of physical models 103 are used, the prediction module 14 may calculate an even more accurate posterior probability distribution (life distribution) using the timing indicators predicted by the respective physical models 103. For example, the prediction module 14 considers the posterior probability distribution calculated using the prediction results from one physical model 103 as a prior probability distribution, and further calculates the posterior probability distribution using the prediction results from another physical model 103.

Steps S207 to S208 are the same as Steps S108 to S109 in FIG. 11 (the prediction process PA), and thus description thereof is omitted.

Figure 15:
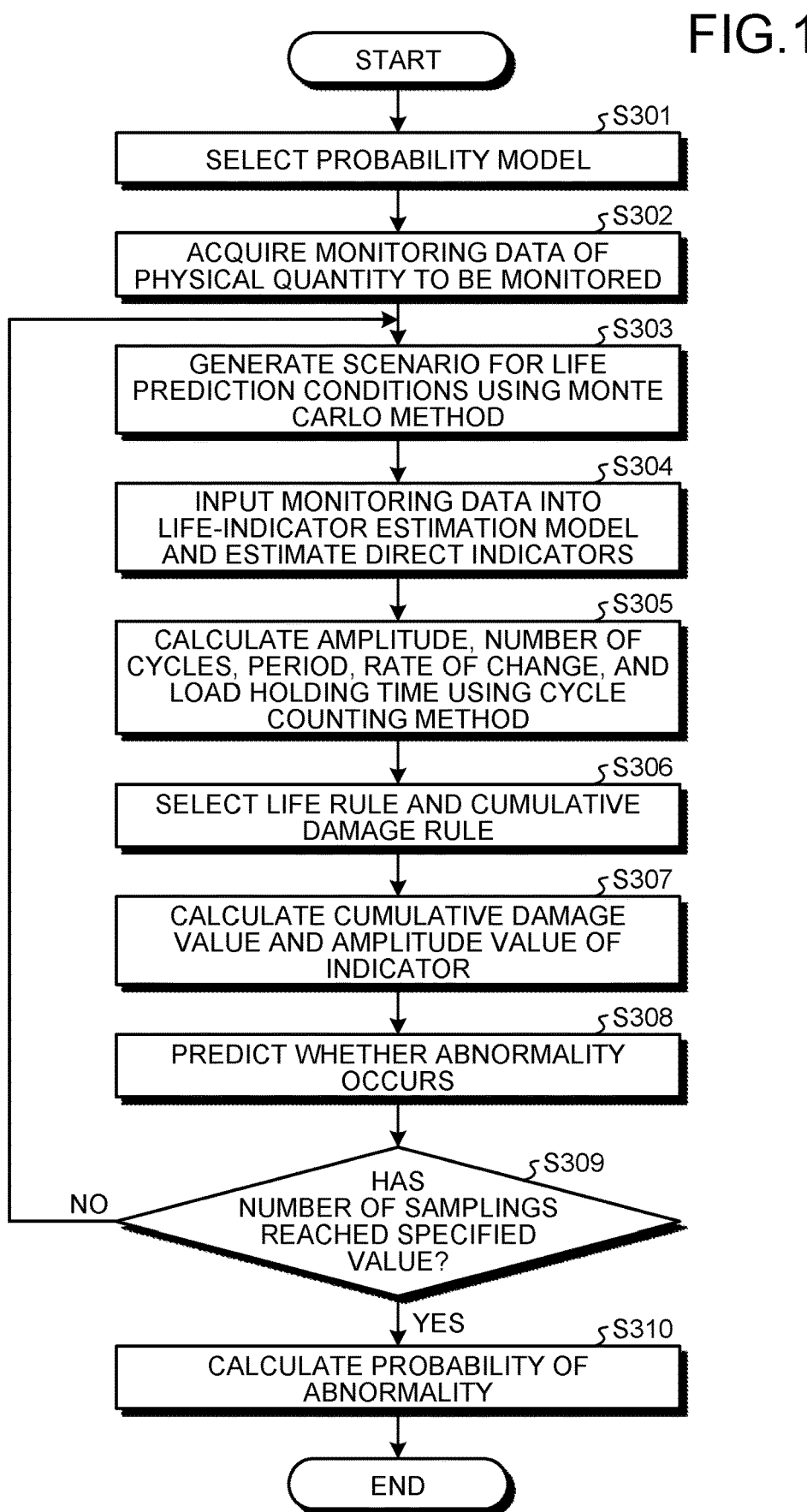
FIG. 15 is a flowchart of life prediction using a prediction model.

FIG. 15 is a flowchart illustrating a specific example of life prediction using the prediction model 102, that is, Steps S101 to S104 in FIG. 9 (Steps S201 to S204 in FIG. 14).

The prediction module 14 selects a probability model that represents uncertainties about life prediction conditions such as load conditions, strength conditions, environmental conditions, material property conditions, structural and dimensional conditions, and boundary conditions (Step S301). The probability model may include modeling when the state of each condition transitions over time.

The prediction module 14 acquires the monitoring data (e.g., time-series data representing temperature history) of a physical quantity corresponding to a condition to be monitored among the life prediction conditions (Step S302). The prediction module 14 generates scenarios (sampling points) for conditions other than that to be monitored among the life prediction conditions using a Monte Carlo method based on the selected probability model (Step S303).

Based on the generated scenarios, the prediction module 14 inputs the monitoring data into the life-indicator estimation model included in the prediction model 102 to estimate direct indicators such as inelastic strain ranges (Step S304).

The prediction module 14 calculates the amplitude (e.g., inelastic strain range), the number of cycles, a period, the rate of change (e.g., strain rate during ascent and descent), and a load holding time for the time-series data of direct indicators, using a cycle counting method such as the RainFlow method (Step S305).

The prediction module 14 selects a life rule (Coffin-Manson rule, Basquin rule, etc.) and a cumulative damage rule (linear cumulative damage rule, strain partitioning method, nonlinear cumulative damage rule, etc.) (Step S306). The prediction module 14 calculates the cumulative damage value and the amplitude value of the indicator (e.g., equivalent inelastic strain range), which is an equivalent physical quantity when converted to temporally the same amplitude value (Step S307).

The prediction module 14 compares the Monte Carlo sampling value obtained from the probability distribution of the strength (e.g., fatigue strength) or the criterion (e.g., fatigue life cycle) at the target time (number of life cycles) with the calculated amplitude value (e.g., equivalent inelastic strain range) to determine whether an abnormality occurs (whether the system fails) (Step S308).

The prediction module 14 determines whether the number of samplings has reached a specified value (Step S309). If the number of samplings has not reached the specified value (No at Step S309), the flow returns to Step S303 to generate more sampling points and repeat the process.

If the number of samplings has reached the specified value (Yes at Step S309), the prediction module 14 uses the determination result at Step S308 to calculate the probability of system failure (e.g., breakage probability) at target time (e.g., the number of life cycles) (Step S310). The calculated probability corresponds to the life distribution predicted at Step S104 (Step S204), for example.

For the constituent element E1, the prediction module 14 may predict timing indicators (e.g., life) using a prediction model 102 that does not include a physical model for predicting direct indicators. In this case, for example, any of the sub-library basis functions 1002 are combined to generate the prediction model 102 for outputting life that is a timing indicator 1004.

Figure 16:
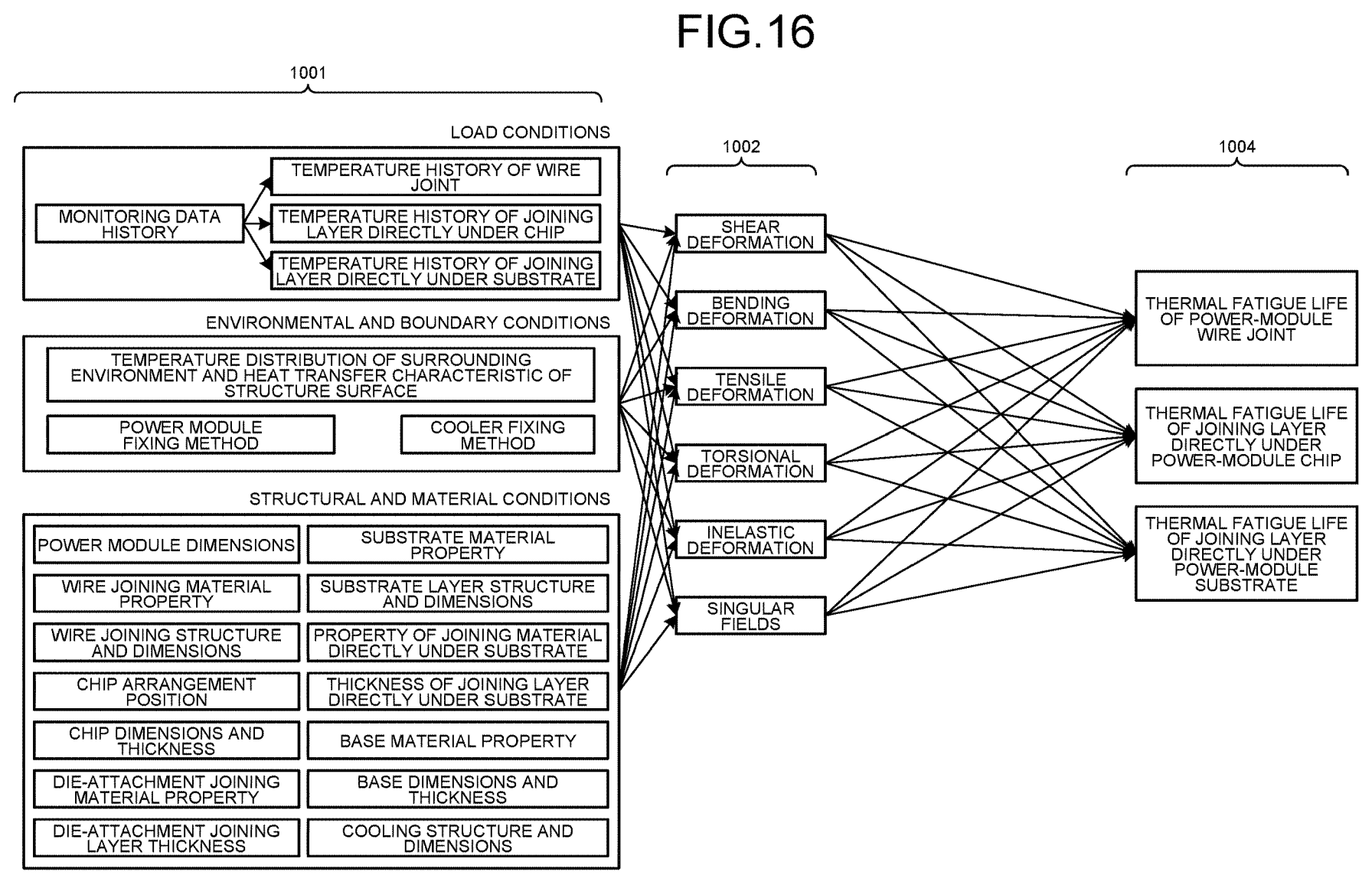

FIG. 16 is a diagram illustrating a relation between causal phenomena and each indicator, for example, when such a prediction model 102 is used. In the example in FIG. 16, a model into which any of the sub-library basis functions 1002 are combined corresponds to the prediction model 102 for outputting life that is a timing indicator 1004.

Figure 17:
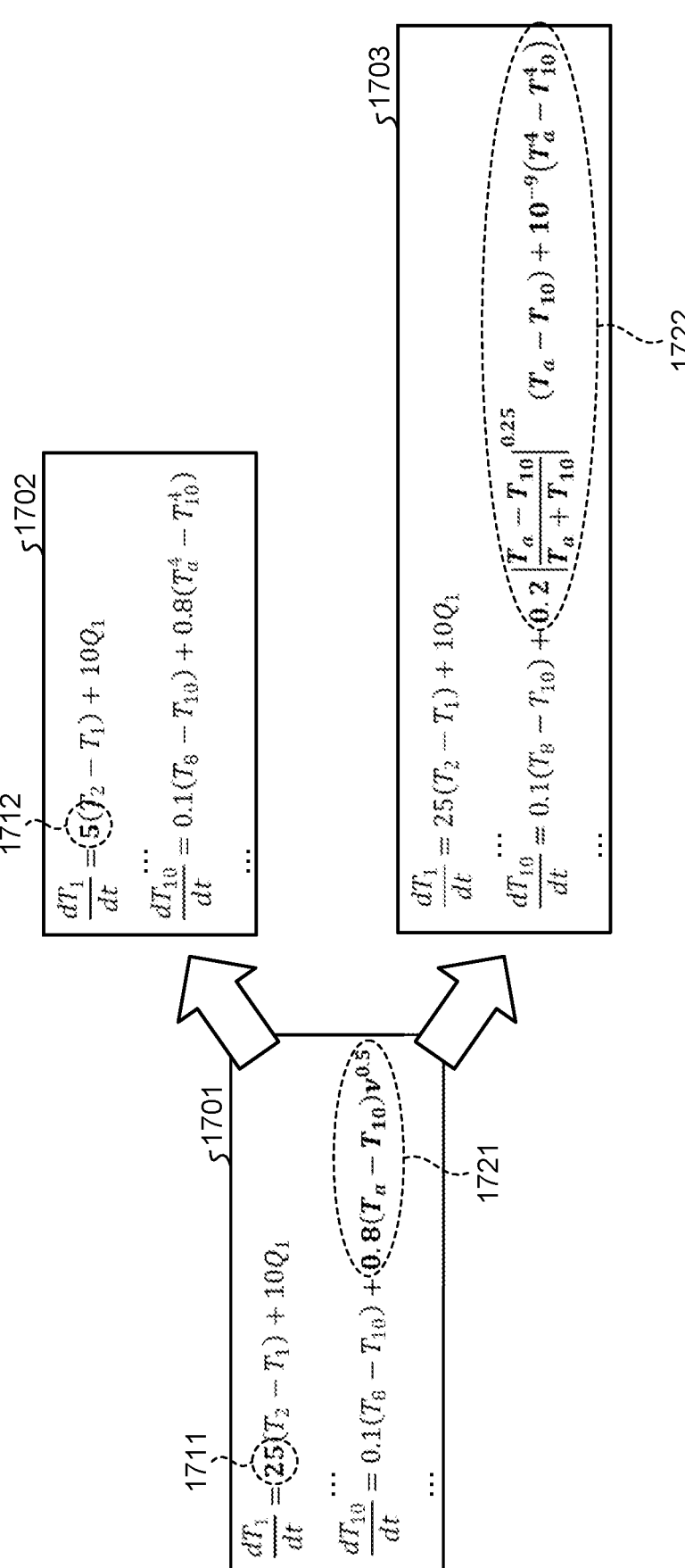
FIG. 17 is a diagram illustrating an example of a model to be updated.

The following describes an example of model updating. The model may be updated (re-created) periodically or as specified, for example, using monitoring data obtained sequentially as the system operates. FIG. 17 is a diagram illustrating an example of a model that is updated in this manner.

A model 1701 is, for example, a model generated using monitoring data acquired on the first to the tenth days from the start of operation. A model 1702 and a model 1703 are examples of models generated using monitoring data obtained on the 100th to 110th days from the start of operation. When pieces of monitoring data thus acquired are different, different forms of models such as the models 1702, 1703 can be generated.

$T_1$ to $T_{10}$ represent temperatures at 10 areas, for example. A coefficient 1711 and a function 1721 are examples of coefficients and functions of nonlinear basis functions included in the model 1701.

A coefficient 1712 is an example of a coefficient in the model 1702 corresponding to the coefficient 1711, having a value that is updated from 25 of the coefficient 1711 to 5. For example, the coefficients 1711, 1712 are coefficients of terms representing the ease of heat transfer from a device to a substrate through a joining layer. In this case, a decrease in the value of each coefficient corresponds to an increase in contact thermal resistance, for example, due to growth of a crack in the joining layer between the device and the substrate. The prediction module 14 can predict life based on the relation between the degree of increase in contact thermal resistance due to crack growth and the life.

A function 1722 is an example of a function in the model 1703 corresponding to the function 1721 and is updated from the function 1721. For example, the function 1721 is a function related to forced air cooling, and the function 1722 is a function related to natural air cooling. In this case, the replacement of the function 1721 related to forced air cooling with the function 1722 related to natural air cooling corresponds to, for example, an occurrence of clogging of a cooling fan due to dust. In other words, the cause of the diagnostic result of cooling performance can be determined to be the clogging of the cooling fan. Thus, according to the present embodiment, the accountability of the predictions by the updated model 1703 can be improved.

The following describes other examples of the sub-libraries. The sub-libraries are not limited to the above-described examples, and may be, for example, libraries of:

A group of heat transfer functions;

A group of fluid resistance/pipe friction functions;

A group of deformation response functions based on material mechanics;

A group of inelastic deformation response functions;

A group of friction models; and

A group of fatigue life rules/damage rules

The systems to which the present embodiment can be applied are not limited to those described above. For example, the method according to the present embodiment can be adapted for predictive maintenance and control of systems to be monitored, such as:

A wind power plant in which, based on deformation behavior data from camera image monitoring analysis thereof, boundary displacement conditions (torsional deformation of a main shaft surface, bending deformation of a support surface, etc.) that have a greater influence on the life of a drive train structure are identified, and the life and failure risks are predicted and controlled;

Wind power drive train rotating machinery in which, based on the history of deformation and strain distribution data from camera image monitoring and analysis thereof, loose screws, rattling parts, or abnormal lubrication parts are identified, and the life and failure risks are predicted and controlled;

Wind power drive train rotating machinery in which, based on temperature data history thereof, abnormal lubrication parts are identified;

A wind power drive train generator in which, based on output and wind speed histories thereof, power electronics degradation, rotating machinery degradation, or storage battery degradation is identified, and the life and failure risks are predicted and controlled; and A storage battery system in which, based on the sensor histories such as an operating history therein, a fluid resistance network is used to derive a wind velocity, a thermal network is used to predict a temperature, and the degree of deterioration and the risk of failure are predicted and controlled.

As described above, in the present embodiment, two models are generated and predictions are made using the two models. This enables the model-based prediction to be made with higher accuracy. Furthermore, the information processing device 1 according to the present embodiment extracts the nonlinear basis function from the sub-library including the nonlinear basis functions on the basis of the generation probability, generates the linear regression equations combining the nonlinear basis functions of the plurality of types of sub-libraries, and regenerates the linear regression equation while tuning the generation probability and the hyperparameter of machine learning until the predetermined condition is met.

In this case, the information processing device 1 regenerates the linear regression equation while tuning the generation probability and the hyperparameter of machine learning, and narrows down the linear regression equation to be generated by changing the generation probability. As a result, the information processing device 1 can output an appropriate linear regression equation while reducing a search space. That is, the information processing device 1 can generate a model of an appropriate physical phenomenon.

Figure 18:
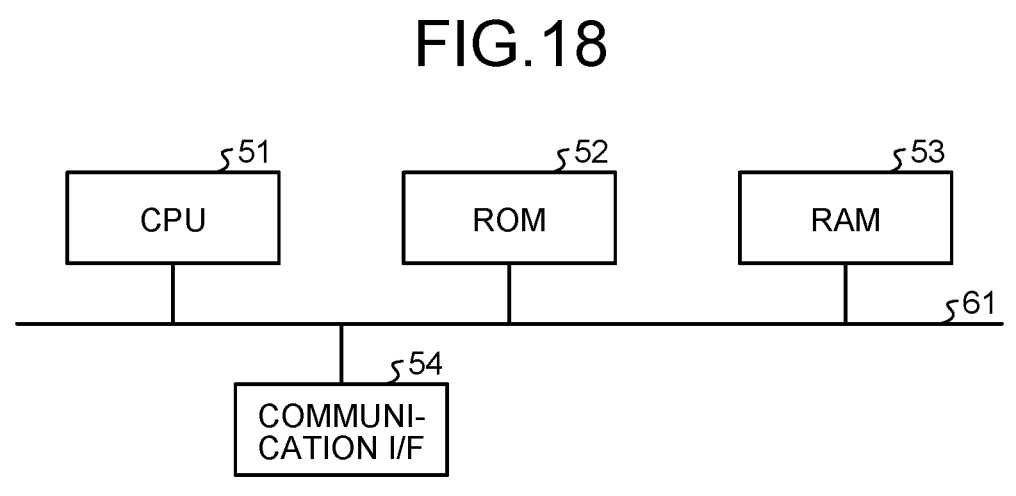

The following describes a hardware configuration of the information processing device according to the embodiment with reference to FIG. 18. FIG. 18 is a block diagram illustrating an example of a hardware configuration of the information processing device according to the embodiment.

The information processing device according to the embodiment includes a control unit such as a central processing unit (CPU) 51, memories such as a read only memory (ROM) 52 and a random access memory (RAM) 53, a communication I/F 54 for connecting to a network for communication, and a bus 61 connecting the components to each other.

A computer program to be executed by the information processing device according to the embodiment is provided in a manner preinstalled in the ROM 52, for example.

The computer program to be executed by the information processing device according to the embodiment may be configured to be provided as a computer program product in an installable or executable format file recorded on a computer-readable storage medium such as a compact disc read only memory (CD-ROM), a flexible disk (FD), a compact disc recordable (CD-R), and a digital versatile disc (DVD).

Furthermore, the computer program to be executed by the information processing device in the embodiment may be configured to be stored on a computer connected to a network such as the Internet and to be provided by being downloaded via the network. The computer program to be executed by the information processing device according to the embodiment may be configured to be provided or distributed via a network such as the Internet.

The computer program to be executed by the information processing device according to the embodiment can cause a computer to function as the respective components of the information processing device described above. This computer can execute the computer program by causing the CPU 51 to load it from the computer-readable storage medium on its main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
one or more processors coupled to the memory and configured to:
    generate, by machine learning using time-series data of a variable for a phenomenon related to an abnormality in a system to be monitored, a prediction model and a physical model, the prediction model being a model for predicting an indicator used to identify a timing of maintenance of the system, the physical model being a model for predicting the variable; and
    perform either one of a first prediction process and a second prediction process, the first prediction process using the physical model that is learned using the indicator predicted by the prediction model, the second prediction process being a process of correcting the indicator predicted by the prediction model, by using the variable predicted using the physical model, wherein
    the second prediction process includes predicting the variable by the physical model, predicting the indicator by using relation information indicating a relation between the predicted variable and the indicator, and correcting the indicator predicted by the prediction model by using the indicator predicted by using the relation information.

2. The device according to claim 1, wherein
the memory is configured to store therein a plurality of types of sub-libraries including nonlinear basis functions based on a dependent variable or an independent variable and generation probabilities of the nonlinear basis functions included in each of the sub-libraries, wherein
the one or more processors are configured to generate the prediction model and the physical model by combining one or more of the nonlinear basis functions extracted based on the generation probabilities from the sub-libraries.

3. The device according to claim 2, wherein
the one or more processors are configured to correct the generation probabilities to increase the generation probability of a nonlinear basis function having a greater influence on the indicator than other nonlinear basis functions among the nonlinear basis functions, and
the first prediction process uses the physical model generated by combining the nonlinear basis functions extracted based on the generation probabilities corrected.

4. The device according to claim 2, wherein
the one or more processors are configured to:
    generate, for an object model that is either of the prediction model and the physical model, a plurality of the object models by combining one or more of the nonlinear basis functions extracted based on the generation probabilities from the plurality of types of sub-libraries, and calculate loss functions for the respective object models;
    correct the generation probabilities and hyperparameters of the machine learning, based on the loss functions, and
    regenerate, by machine learning using the hyperparameters corrected, the object models by combining one or more of the nonlinear basis functions extracted based on the generation probabilities corrected from the plurality of types of sub-libraries.

5. The device according to claim 4, wherein the one or more processors are configured to output information indicating the object models selected by a rank order based on the loss functions.

6. The device according to claim 1, wherein the second prediction process includes
predicting the variable by the physical model,
predicting the indicator by using the relation information indicating the relation between the predicted variable and the indicator,
predicting a prior probability distribution of the indicator by the prediction model, and
calculating a posterior probability distribution based on multiplication of the prior probability distribution by the indicator that is predicted by using the relation information.

7. The device according to claim 1, wherein
an object model that is either of the prediction model and the physical model includes a linear regression equation, and
the one or more processors are configured to estimate a coefficient of the linear regression equation by sparse estimation.

8. An information processing method to be executed by an information processing device, the method comprising:
generating, by machine learning using time-series data of a variable for a phenomenon related to an abnormality in a system to be monitored, a prediction model and a physical model, the prediction model being a model for predicting an indicator used to identify a timing of maintenance of the system, the physical model being a model for predicting the variable; and
performing either one of a first prediction process and a second prediction process, the first prediction process using the physical model that is learned using the indicator predicted by the prediction model, the second prediction process being a process of correcting the indicator predicted by the prediction model, by using the variable predicted using the physical model, wherein the second prediction process includes predicting the variable by the physical model, predicting the indicator by using relation information indicating a relation between the predicted variable and the indicator, and correcting the indicator predicted by the prediction model by using the indicator predicted by using the relation information.

9. A computer program product comprising a non-transitory computer-readable medium including programmed instructions, the instructions causing a computer to execute:

generating, by machine learning using time-series data of a variable for a phenomenon related to an abnormality in a system to be monitored, a prediction model and a physical model, the prediction model being a model for predicting an indicator used to identify a timing of maintenance of the system, the physical model being a model for predicting the variable; and performing either one of a first prediction process and a second prediction process, the first prediction process using the physical model that is learned using the indicator predicted by the prediction model, the second prediction process being a process of correcting the indicator predicted by the prediction model, by using the variable predicted using the physical model, wherein the second prediction process includes predicting the variable by the physical model, predicting the indicator by using relation information indicating a relation between the predicted variable and the indicator, and correcting the indicator predicted by the prediction model by using the indicator predicted by using the relation information.

10. The device according to claim 6, wherein the one or more processors are configured to perform:

predicting the variable by a second physical model, predicting the indicator by using the relation information and the variable predicted by the second physical model, and calculating a second posterior probability distribution based on multiplication of the posterior probability distribution by the indicator that is predicted by using the variable predicted by the second physical model.

\* \* \* \* \*